United States Patent [19]

Chen

[11] Patent Number: 4,902,569
[45] Date of Patent: * Feb. 20, 1990

[54] NOVEL ADHESIVES AND TAPES INCLUDING SAME

[75] Inventor: Samuel J. Chen, Lexington, Mass.

[73] Assignee: Kendall Company, Lexington, Mass.

[*] Notice: The portion of the term of this patent subsequent to Feb. 13, 2007 has been disclaimed.

[21] Appl. No.: 114,463

[22] Filed: Oct. 29, 1987

[51] Int. Cl.$^4$ ............................................. C08F 265/04
[52] U.S. Cl. .................................... 428/344; 428/461; 525/301; 526/304
[58] Field of Search ............... 428/457, 458, 461, 344, 428/355; 525/301, 381; 526/304

[56] References Cited

U.S. PATENT DOCUMENTS

| 4,522,97 | 6/1985 | Ley et al. | 525/328.2 X |
| 4,510,274 | 4/1985 | Okazaki et al. | 524/322 X |
| 4,521,563 | 6/1985 | Lucas | 525/328.2 X |
| 4,554,324 | 11/1985 | Husmon et al. | 525/301 |

*Primary Examiner*—George F. Lesmes
*Assistant Examiner*—J. Davis
*Attorney, Agent, or Firm*—Alvin Isaacs

[57] ABSTRACT

Novel adhesives for preparing metal foil adhesive tapes meeting Underwriter Laboratories requirements for use with rigid fiberglass air ducts, which adhesives comprise a self- (internally) crosslinked copolymer of: (1) from about 1.5 to about 2.5 parts by weight of at least one activated ester-containing vinyl monomer of Formula I (as defined hereinafter); (2) from about 11 to about 14 parts by weight of at least one ethylenically unsaturated carboxylic acid containing 3-5 carbon atoms; (3) from about 70 to about 80 parts by weight of at least one acrylic or methacrylic acid ester of a nontertiary alcohol having 1-14 carbon atoms; and (4) from about 6 to about 15 parts by weight of at least one vinyl ester of a saturated carboxylic acid.

13 Claims, No Drawings

NOVEL ADHESIVES AND TAPES INCLUDING SAME

RELATED APPLICATIONS

This application is related to my copending applications, Ser. Nos. 019,832 filed Feb. 28, 1987 and 030,765 filed Mar. 25, 1987.

BACKGROUND OF THE INVENTION

The present invention relates to novel adhesives and, more particularly, to novel adhesives which can be coated onto an aluminum backing material to provide so-called foil tapes which meet the very severe Underwriter Laboratories, Inc. (UL) 181A requirements and specifications for use with rigid fiberglass air ducts.

Foil tapes, e.g. pressure-sensitive or heat-bonded aluminum tapes are of course known in the art. It is also heretofore known to employ foil tapes for such purposes as closure systems for use with factory-made air ducts and connectors. However, recently UL has imposed very severe standards for this usage. Consequently, the primary task of this invention can be said to develop a novel aluminum (foil) tape which will meet the recent UL requirements and specifications, as detailed hereinafter, for the aforementioned usage.

UL Test No. 1: Peel Adhesion

Three samples from each of three separate rolls of tape cut in one inch (25.4 mm) wide by 12 inches (305 mm) long strips are to be tested. The tape samples are to be applied (as specified in ASTM D-333-83) to a stainless steel panel with a mechanically operated roller weighing 10 pounds (4.53 kg). The roller is to pass over each sample five times in each direction. The test load is to be applied 15 minutes after completion of the rolling. The average peel adhesion strength of each roll of aluminum tape shall be $\geq 3.75$ lbs. (60 oz.) per inch of width (0.66N/mm) of tape, with no individual sample having a value $\leq 3.20$ lbs. (51.2 oz.) per inch of width (0.56N/mm).

UL Tests Nos. 2–5: Shear Adhesion

The shear adhesion strength of aluminum tape is to be determined in accordance with ASTM D-3654-82, as modified in the following description. One sample from each of four separate rolls are to be tested. Samples are to be cut in 1-inch (25.4 mm) wide by 6-inch (152 mm) long strips. The cut samples and specified stainless steel panels are to be maintained at the specified application conditions a minimum of one hour prior to applying samples to the panels. The tape is to be applied to the panel with a mechanically operated roller weighing 10 pounds-mass (4.53 kg). The roller is to pass each sample five times in each direction. Using a cutting gig or razor blade, the rolled portion of the sample is to be trimmed to a 1 inch by 1 inch square on the panel, such that the remaining test sample measures 1 inch by 5 inches. The tape is to be allowed to dwell on the panel for the specified time. After dwelling, the clamp is to be placed on the free end of the sample, insuring that the clamp extends completely across the width of the specimen and is aligned to uniformly distribute the load. The specified test load is then to be applied to the clamp gently so as not to cause any shear impact force on the sample. The load is to be applied for the specified test duration. The test panel is to be positioned at 2 degrees from the vertical so that the test substrate forms a 178° angle with the extended tape sample. Individual samples of the tape are to be tested in accordance with each of the conditions as set forth hereinbelow:

| Application Condition | Dwell Time | Test Condition | Test Load | Duration |
|---|---|---|---|---|
| 2. 40° F. (4.4° C.) dry substrate | 15 min. | 40° F. | 5 lbs. (22.2 N) | 6 hours |
| 3. 73.4° F. (23° C.) 50% RH | 15 min. | 73.4° F. | 5 lbs. | 6 hours |
| 4. 73.4° F. (23° C.) 50% RH | 24 hrs. | 73.4° F. | 10 lbs. | 120 hours |
| 5. 73.4° F. (23° C.) 50% RH | 15 min. | 150° F. (65.6° C.) | 5 lbs. | 6 hours |

The shear adhesion strength of the tape (in each of the above tests) shall be such that the tape is able to maintain these test loads specified in the tests for the indicated test durations without evidence of separation or slippage in excess of 1/32 inch (0.79 mm).

The aforementioned tests (peel adhesion and shear adhesion) constitute the essential criteria which are critical to achieve in order to provide an aluminum tape meeting UL specifications for use with air ducts and connectors. However, for the sake of accuracy, it is to be noted that they are not the only tests which must be passed to satisfy UL specifications. One such test is a tensile strength test for the tape backing (foil). Another is peel adhesion at 20° angle. The former is not relevant to this invention and the latter will be met if the adhesive passes the five critical tests enumerated above.

Other UL criteria, specifically surface burning characteristics, mold growth and humidity test, temperature/pressure cycling tests, burning test and manufacturing and production tests, as detailed in UL181A, are not difficult to meet and for purpose of a clear understanding of the nature and objects of this invention need not be described.

My aforementioned copending application, Ser. No. 019,832 is also directed to the task of providing an adhesive which can be employed for preparing metal foil adhesive tapes meeting UL specifications. In this copending application, the task is solved by providing an adhesive composition comprising a crosslinked copolymer of:

(1) at least one specified macromolecular monomer;

(2) at least one ethylenically unsaturated carboxylic acid containing 3–5 carbon atoms;

(3) at least one acrylic or methacrylic acid ester of a non-tertiary alcohol having 1–14 carbon atoms; and (4) at least one vinyl ester of a saturated carboxylic acid;

the tetrapolymer being crosslinked with a crosslinking agent reactive with said carboxylic acid moiety through its reactive hydrogen atom.

My aforementioned copending application, Ser. No. 030,765, to which the present invention is more closely related, also relates to adhesives for preparing metal foil tapes meeting the aforementioned UL specifications, the task being solved by employing, in lieu of the macromolecular monomers of Ser. No. 019,832, an activated ester-containing vinyl monomer of the formula:

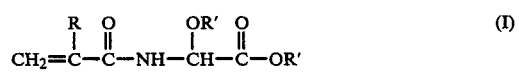

(I)

wherein R is hydrogen or methyl; and each R', which may be the same or different, is alkyl having 1–6 carbon atoms, cycloalkyl having 5–6 carbon atoms, or a 2-hydroxyalkyl 2–6 carbon atoms, the polymer being crosslinked with a crosslinking agent reactive with the carboxylic acid moiety through its reactive hydrogen atom.

Useful monomers of Formula I include methyl acrylamidoglycolate methyl ether (MAGME), ethyl acrylamidoglycolate ethyl ether, butyl acrylamidoglycolate butyl ether, methyl acrylamidoglycolate ethyl ether, and ethyl acrylamidoglycolate methyl ether.

The monomers of Formula I, including the aforementioned illustrative species, are known in the art and are described, for example, in U.S. Pat. No. 4,521,563 issued to Howard R. Lucas and assigned to American Cyanamid Company.

A preferred monomer of this description is:

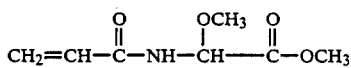

(II)

Methylacrylamidoglycolate methyl ether (MAGME)

a white solid, melting point 70°–73° C., available commercially in 95–97% purity from American Cyanamid Co. A preferred method of preparing MAGME is disclosed in U.S. Pat. No. 4,443,623, issued to James M. Photis and assigned to American Cyanamid Company.

As examples of useful ethylenically unsaturated carboxylic acids containing 3–5 carbon atoms, mentioned may be made of acrylic acid, methacrylic acid, titaconic acid, maleic acid and fumaric acid, acrylic acid being particularly preferred.

Useful acrylic or methacrylic acid esters of non-tertiary alcohols having 1–14 carbon atoms include those previously mentioned with reference to U.S. Pat. No. 4,554,324, i.e. methanol, ethanol, propanol and isopropanol 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-decanol, 1-dodecanol as well as others. Preferred are acrylic acid esters of non-tertiary alcohols having 4–14 carbon atoms, e.g. butyl acrylate, amyl acrylate, decyl acrylate, lauryl acrylate, and the like, 2-ethylhexyl acrylate being particularly preferred.

Suitable vinyl esters are those wherein the acid contains 1–6 carbon atoms, e.g. vinyl acetate, vinyl proportionate, vinyl butyrate, vinyl valerte, etc., vinyl acetate being particularly preferred.

As is described, following polymerization of the recited monomeric components, a crosslinking agent reactive with the carboxylic acid moiety is then added in a quantity sufficient to effect crosslinking of the polymer so as to increase the shear adhesion to meet UL requirements. In like manner, the ranges of monomeric components will also be selected to satisfy the UL requirements.

In the latter context, the following ranges of monomers were found to be operative:

(1) from about 5 to about 20 parts by weight of a monomer or mixture of monomers of Formula I;

(2) from about 3 to about 10 parts by weight of ethylenically unsaturated carboxylic acid;

(3) from about 70 to about 85 parts by weight of acrylic or methacrylic acid ester of a non-tertiary alcohol having 1–14 carbon atoms; and (4) from about 7 to about 22 parts by weight of vinyl ester of a saturated carboxylic acid.

The inventions described and claimed in both of these copending applications will provide adhesives suitable for preparing metal foil tapes meeting UL specifications for use with rigid fiberglass air ducts. However the macromers required in the former application are not readily commercially available. On the other hand, the monomers of Formula I, e.g. MAGME, employed in the latter application are relatively expensive.

Accordingly, broadly speaking, the task of the present invention may be said to be to provide a more cost-effective and thus a more commercially competitive adhesive of this description, utilizing available materials.

More specifically, the task may be said to be to devise a system utilizing the monomeric components of the latter application wherein appreciably less of the recited and relatively expensive monomer of Formula I is employed.

BRIEF DESCRIPTION OF THE INVENTION

In accordance with the present invention, it has been discovered that if the monomeric components of the latter application are admixed in the following proportions:

(1) from about 1.5 to about 2.5 parts by weight of the monomer of Formula I;

(2) from about 11 to about 14 parts by weight of ethylenically unsaturated carboxylic acid containing 3–5 carbon atoms;

(3) from about 70 to about 80 parts by weight of acrylic and/or methacrylic acid ester of a non-tertiary alcohol having 1–14 carbon atoms; and (4) from about 6 to about 15 parts by weight of at least one vinyl ester of a saturated carboxylic acid, in the presence of an acid catalyst, the requisite adhesive meeting UL specifications is obtained without the need of an additional crosslinking agent.

The very substantial reduction in the amount of monomer of Formula I employed has been found to provide a cost reduction in manufacture of on the order of about 30 percent.

DETAILED DESCRIPTION OF THE INVENTION

As previously stated, the present invention is directed to a cost-effective procedure for preparing metal foil adhesive tapes meeting UL181A requirements for use with rigid fiberglass air ducts.

In essence, the present invention can be said to be an improvements over the teachings of the aforementioned copending application, Ser. No. 030,765 wherein appreciably less of the relatively expensive monomer of Formula I is required to obtain an adhesive satisfying the UL specifications.

These monomers may be described as being multi-functional acrylic monomers in the sense that both the vinyl end group and the alkoxymethyl amide group are reactive.

The preferred monomer of this formula is "MAGME" (trademark of Cyanamid for methyl acrylamidoglycolate methyl ether) and the invention will accordingly be described in detail by reference thereto.

MAGME is a reactive crosslinking monomer illustrative of Formula I combining a readily polymeriable vinyl end group and a methoxymethyl amide group which is responsive to acid catalysis.

Because of the reactivity of the double bond (vinyl group), MAGME can be polymerized with most vinyl monomers, e.g. acrylates, methacrylates, styrene, acrylonitrile, acrylamide, vinyl acetate, etc.

On the other hand, polymers containing MAGME monomer can be heat cured using acidic catalysts. The amide derivatives of MAGME also undergo this reaction. Curing can occur either by self-condensation or by reaction with hydroxyl, carboxyl or amide groups. Either reaction provides methanol as a reaction by-product.

The self-condensation is as follows:

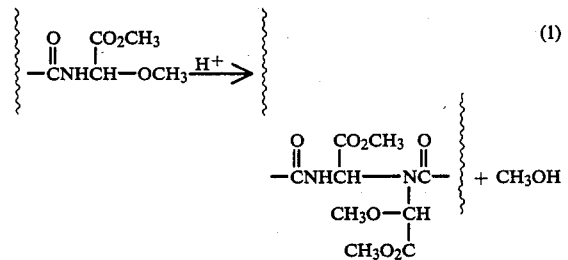

The reaction with carboxyl, for example, may proceed according to the following two alternate reaction schemes or equations:

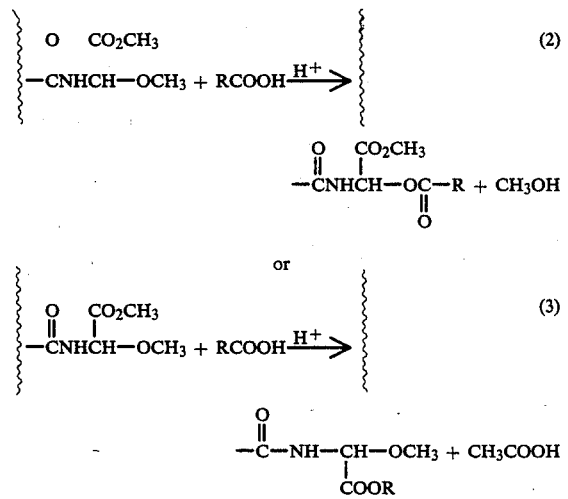

Because of its ability to function an an "internal" or "latent" crosslinker which can be self-condensed or crosslinked in the presence of acid catalysts, no "external" or additional crosslinker is needed in the practice of this invention.

The precise mechanism of the crosslinking reaction in the presence of an acid catalyst for a given formulation is not entirely clear. It may take place between the MAGME moieties of two polymer molecules by the self-condensation reaction of equation (1) by substitution of the RCOO— moiety of the ethylenically unsaturated carboxylic acid (e.g. acrylic acid) monomer for the methoxy substituent as illustrated in equation; (2) by substitution of the —COOR for the —CO$_2$CH$_3$ as illustrated in equation; (3) or by a combination of the above reactions.

In any event, sufficient crosslinking will occur to pass UL181A specifications. In this context, it will be noted that if no acid catalyst is employed, the resulting adhesive will not pass these specifications.

In general, if too little acid catalyst is employed, there will be insufficient crosslinking to meet the UL specifications and the adhesive will fail. On the other hand, if too much is used, the adhesive tends to lose tack. In any event, the amount of acid catalyst to be employed will be readily apparent by routine experimentation to one skilled in the art in the light of the foregoing discussion. By way of illustration, however, from about 0.02 to about 0.06 parts by weight per 100 parts by weight of polymer has been found to be satisfactory.

The selection of the particular acid catalyst to be employed will also be within the expected judgment of the skilled worker. Acid catalysts are of course well known and understood in the art. In general, they may be characterized as being strong acids. Sulfonic acids such as p-toluene sulfonic acid and methane sulfonic acid are illustrative of those commonly employed.

Apart from the need for an acid catalyst, the amounts of monomers which may be employed are critical within fairly narrow ranges in order to achieve consistent or reproducible acceptable results.

It has been found that the ranges of monomers which may be employed are:

(1) from about 1.5 to about 2.5 parts by weight of the monomer of Formula I;

(2) from about 11 to about 14 parts by weight of the ethylenically unsaturated acid;

(3) from about 70 to about 80 parts by weight of the acrylic or methacrylic acid ester; and (4) from about 6 to about 15 parts by weight of the vinyl ester.

The novel adhesives of this invention may be prepared by initiating polymerization of the monomeric components in a suitable organic solvent and then adding the acid catalyst to the reaction mixture shortly before polymerization is complete, e.g. after polymerization is about ¾ complete. The polymerization is then allowed to proceed to completion.

The selection of the organic solvent for the monomers is not critical and useful solvents will be within the expected judgement of the skilled worker. By way of illustration a 1/99 mixture of isopropyl alcohol and ethyl acetate was employed in the following illustrative examples.

In these examples, the following polymers were prepared:

TABLE 1

| Cpd. | EHA | MAG | AA | VA | Cat. | Solids % | Visc. |
|---|---|---|---|---|---|---|---|
| 1 | 76 | 2 | 11 | 11 | 0 | 48.4 | 12.3 |
| 2 | 76 | 2 | 11 | 11 | 0.04 | 48.7 | 10.5 |
| 3 | 75 | 2 | 12 | 11 | 0.04 | 48.9 | 10.2 |
| 4 | 74 | 2 | 13 | 11 | 0.04 | 49.2 | 12.0 |
| 5 | 73 | 2 | 14 | 11 | 0.04 | 48.8 | 20.0 |

EHA = 2-ethylhexyl acrylate
MAG = MAGME
AA = Acrylic acid
VA = Vinyl acetate
CAT. = Acid catalyst

EXAMPLE 1

Two monomer solutions were prepared with the following amounts in grams:

|  | (1) | (2) |
| --- | --- | --- |
| 2-Ethylhexyl Acrylate | 9.50 | 28.50 |
| MAGME | 0.25 | 0.75 |
| Acrylic Acid (glacial) | 1.38 | 4.12 |
| Vinyl Acetate | 1.38 | 4.12 |
| Luprisol PMS | 0.125 | — |
| Isopropyl Alcohol (reagent grade) | 0.13 | 0.37 |
| Ethyl Acetate (reagent grade) | 16.27 | 22.03 |

Monomer solution (1) was charged into a reactor, heated to 75°–77° C. and sparged with nitrogen. An exotherm was noted within 20 minutes. At the beginning of the exotherm, the upper jacket cooling was turned on to full cooling to control the temperature to less than 85° C. The temperature was maintained at 77°–85° C. for 40 minutes after the peak of the exotherm. After this period an initiator solution of 0.115 grams of azobisisobutyronitrile (AIBN) and 5.65 grams of ethyl acetate and monomer solution (2) were fed into the reactor in separate streams. A (second) exotherm was noted within 20–30 minutes. After this exotherm subsided, a temperature of 77°–81° C. and a blanket of nitrogen were maintained over the polymer reaction mixture. The lines were then rinsed with 4.0 grams of ethyl acetate, after which the reaction mixture was maintained at about 77° C. for one hour. A (second) initiator solution of 0.01 grams of AIBN and 1.3 grams of ethyl acetate were then added. The mixture was held at about 77° C. for an additional two hours and then cooled to yield a solution of the polymer of Formula 1 exhibiting the following properties: solid content: 48.38%; monomer conversion: 96.76%; solution viscosity (#4 spindle at 10 RPM): 12,300 cps.

EXAMPLE 2

Example 1 was repeated, except that in the final mixing step, 0.02 grams of p-toluene sulfonic acid was included in the second initiator solution to yield the polymer of Formula 2, solid content: 48.67%; monomer conversation: 97.34%; solution viscosity: 10,500 cps.

EXAMPLES 3–5

In a manner similar to Example 2, the polymers of Formulae 3–5 were prepared by varying the amounts of the monomers accordingly.

Aluminum foil tapes were prepared from each of the adhesives of Formulae 1–5 by casting the adhesive onto the foil backing material at a thickness of about 1.5 mils.

Each of the resulting foil tapes was submitted to the aforementioned UL181A tests 1–5, as previously described in detail.

The results of these tests are set forth in Table 2.

TABLE 2

|  | TEST 1 Peel | TEST 2 Shear (40° F.) | TEST 3 Shear (short term) | TEST 4 Shear (long term) | TEST 5* Shear (high temp.) |
| --- | --- | --- | --- | --- | --- |
| UL181 Requirements Test Compounds | >60 oz. | >6 hrs. | >6 hrs. | >120 hrs. | >6 hrs. |
| 1 | 78 | — | — | — | 0.1 (fail) |
| 2 | 80 | >100 | >100 | >300 | 10.0 (AVG) |
| 3 | 84 | >100 | >100 | >300 | 16.7 |

TABLE 2-continued

|  | TEST 1 Peel | TEST 2 Shear (40° F.) | TEST 3 Shear (short term) | TEST 4 Shear (long term) | TEST 5* Shear (high temp.) |
| --- | --- | --- | --- | --- | --- |
| 4 | 79 | >100 | >100 | >300 | 43.0 (AVG) |
| 5 | 84 | >100 | >100 | >300 | 50.0 (AVG) |

*Since Test 5 is the most difficult to pass and hence the most critical, this test was repeated a number of times for each sample. While the samples all passed the test in every instance, there was some variance in the numbers and accordingly the average time is given for each sample.

In addition to the above polymer preparations and testings, it will be noted that a polymer was also prepared (in the manner described in Example 2) having the proportions: 77EHA/1MAG/11AA/11VA. Upon testings, it was found that this polymer having 1 part MAGME was marginal. It did not always pass the high temperature shear test. Since the result was not always predictable, it was concluded that the lower range for the MAGME monomer should be about 1.5.

It will be noted that in Table 2, the "greater than" (>) sign means that the test was stopped after the indicated passage of time. It accordingly, does not imply that failure resulting at this time and the actual time lapses before failure are simply not known.

By way of recapitulation, the adhesives prepared in accordance of this invention are not alleged to be superior in performance to those prepared in accordance with the aforementioned copending applications. However, while the invention of Ser. No. 019,832 utilizes materials (the macromer) not presently available to the Applicant or his assignee, the invention of Ser. No. 030,765 utilizes significantly greater amounts of the relatively expensive MAGME monomer. Accordingly, the main advantage of the present invention can be said to be the utilization of the commercially available MAGME at a cost reduction of approximately 30% over the cost of preparing adhesives in Ser. No. 019,832. From the standpoint of commercial sale, the significance of this 30% cost reduction will be evident.

Since certain changes may be made without departing from the scope of the invention herein described, it is intended that all matter contained in the foregoing description, including the examples, shall be taken as illustrative and not in a limiting sense.

What is claimed is:

1. An adhesive tape comprising a backing sheet material carrying a layer of adhesive adapted for meeting Underwriters Laboratories specifications for metal foil adhesive tapes for use with rigid fiberglass air ducts, said adhesive comprising an internally crosslinked copolymer of:

(1) from about 1.5 to about 2.5 parts by weight of an activated ester-containing vinyl monomer of the formula:

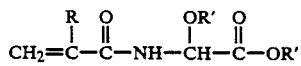

wherein R is hydrogen or methyl; and R' is alkyl having one to six carbon atoms, or 2-hydroxyalkyl having two to six carbon atoms;

(2) from about 11 to about 14 parts by weight of at least one ethylenically unsaturated carboxylic acid containing 3-5 carbon atoms;
(3) from about 70 to about 80 parts by weight of at least one acrylic or methacrylic acid ester of a non-tertiary alcohol having 10-14 carbon atom; and,
(4) from about 6 to about 15 parts by weight of at least one vinyl ester of a saturated carboxylic acid.

2. An adhesive tape comprising a backing sheet material carrying a layer of an adhesive, said adhesive comprising an internally crosslinked copolymer of:
(1) from about 1.5 to about 2.5 parts by weight of an activated ester-containing vinyl monomer of the formula:

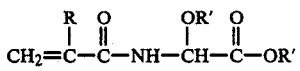

wherein R is hydrogen or methyl; and R' is alkyl having one to six carbon atoms or 2-hydroxyalkyl having two to six carbon atoms;
(2) from about 11 to about 14 parts weight of at least one ethylenically unsaturated carboxylic acid selected from the group consisting of acrylic acid, methacrylic acid, itaconic acid, maleic acid and fumaric acid;
(3) from about 70 to about 80 parts by weight of at least one acrylic or methacrylic acid ester of a non-tertiary alcohol having 1 to 14 carbon atoms selected from the group consisting of 1-butanol, 1-pentanol, 2-pentanol, 3-pentanol, 2-methyl-1-butanol, 2-ethyl-1-hexanol, 1-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-deconal, and 1-dodecanol; and,
(4) from about 6 to 15 parts by weight of at least one vinyl ester of saturated carboxylic acid selected from the group consisting of vinyl acetate, vinyl propionate, vinyl butyrate, and vinyl valerate.

3. A metal foil tape meeting Underwriters Laboratories criteria for use with rigid fiberglass air ducts, said tape comprising a metal foil backing sheet carrying a layer of an adhesive composition comprising an internally crosslinked copolymer of:
(1) from about 1.5 to about 2.5 parts by weight of an activated ester-containing vinyl monomer of the formula:

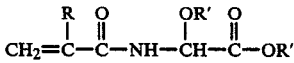

wherein R is hydrogen or methyl; and R' is alkyl having one to six carbon atoms, or 2-hydroxyalkyl having two to six carbon atoms;
(2) from about 11 to about 14 parts by weight of at least one ethylenically unsaturated carboxylic acid containing 3-5 carbon atoms;
(3) from about 70 to about 80 parts by weight of at least one acrylic or methacrylic acid ester of a non-tertiary alcohol having 1-14 carbon atoms; and
(4) from about 6 to about 15 parts by weight of at least one vinyl ester of a saturated carboxylic acid.

4. A metal foil tape as defined in claim 3 wherein said vinyl monomer is methyl acrylamidoglycolate ethyl ether.

5. A metal foil tape as defined in claim 3 wherein said ethylenically unsaturated carboxylic acid is selected from the group consisting of acrylic acid, methacrylic acid, itaconic acid, maleic acid and fumaric acid.

6. A metal foil tape as defined in claim 3 wherein said non-tertiary alcohol is selected from the group consisting of 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 2-ethyl-1-hexanol, 3,5,5-trimethyl-1-hexanol, 3-heptano1,2-octanol,1-decanol and 1-dodecanol.

7. A metal foil tape as defined in claim 3 wherein said vinyl ester is selected from the group consisting of vinyl acetate, vinyl propionate, vinyl butyrate and vinyl valerate.

8. A metal foil tape meeting Underwriter Laboratories criteria for use with rigid fiberglass air ducts, said tape comprising a metal foil backing sheet carrying a layer of an adhesive composition comprising an internally crosslinked copolymer of:
(1) from about 1.5 to about 2.5 parts by weight of an activated ester-containing vinyl monomer of the formula:

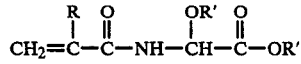

wherein R is hydrogen or methyl; and R' is alkyl having one to six carbon atoms, or 2-hydroxyalkyl having two to six carbon atoms;
(2) from about 11 to about 14 parts by weight of at least one ethylenically unsaturated carboxylic acid selected from the group consisting of acrylic acid, methacrylic acid, itaconic acid, maleic acid and fumaric acid;
(3) from about 70 to about 80 parts by weight of at least one acrylic or methacrylic acid ester of a non-tertiary alcohol having 1 to 14 carbon atoms selected from the group consisting of 1-butanol, 1-pentanol, 2-pentanol, 3-pentanol, 2-methyl-1-butanol, 2-ethyl-1-hexanol, 1-methyl-1-butanol, 1-methyl-1-pentanol, 2-methyl-1-pentanol, 3-methyl-1-pentanol, w-ethyl-1-butanol, 3,5,5-trimethyl-1-hexanol, 3-heptanol2-octanol,1-decanol and 1-dodecanol; and,
(4) from about 6 to about 15 parts by weight of at least one vinyl ester of a saturated carboxylic acid selected from the group consisting of vinyl acetate, vinyl propionate, vinyl butyrate and vinyl valerate.

9. A metal foil tape as defined in claim 8 wherein said vinyl monomer is methyl acrylamidoglycolate ethyl ether.

10. A metal foil tape as defined in claim 9 wherein said carboxylic acid is acrylic acid.

11. A metal foil tape as defined in claim 10 wherein said acrylic acid or methacrylic acid ester is 2-ethylhexyl acrylate.

12. A metal foil tape as defined in claim 11 wherein said vinyl ester is vinyl acetate.

13. A method for forming an adhesion composition adapted for meeting Underwriter Laboratories specifications for metal foil adhesion tapes for use with rigid fiberglass air ducts, comprising the steps of:

(a) initiating polymerization of an organic solution of monomeric components consisting essentially of:

(1) from about 1.5 to about 2.5 parts by weight of an activated ester-containing vinyl monomer of the formula:

$$CH_2=\overset{R}{\underset{|}{C}}-\overset{O}{\underset{\|}{C}}-NH-\overset{OR'}{\underset{|}{CH}}-\overset{O}{\underset{\|}{C}}-OR'$$

wherein R is hydrogen or methyl; and R' is alkyl having one to six carbon atoms, or 2 hydroxyalkyl having two to six carbon atoms;

(2) from about 11 to about 14 parts by weight of at least one ethylenically unsaturated carboxylic acid containing 3–5 carbon atoms;

(3) from about 70 to about 80 parts by weight of at least one acrylic or methacrylic acid ester of a non-tertiary alcohol having 10–14 carbon atoms; and, (4) from about 6 to about 15 parts by weight of at least one vinyl ester of a saturated carboxylic acid; and, (b) before polymerization is complete, adding an acid catalyst to said solution; and (c) thereafter completing said polymerization to form said adhesion composition, (d) coating said composition onto a metal foil backing sheet.

* * * * *